(12) United States Patent
Danilov et al.

(10) Patent No.: US 10,831,742 B2
(45) Date of Patent: Nov. 10, 2020

(54) DATA SET VERIFICATION

(71) Applicant: EMC IP Holding Company LLC, Hopkinton, MA (US)

(72) Inventors: Mikhail Danilov, Saint Petersburg (RU); Andrey Kurilov, Saint Petersburg (RU); Mikhail Malygin, Saint Petersburg (RU); Alexander Rakulenko, Saint Petersburg (RU); Irina Tavantseva, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 202 days.

(21) Appl. No.: 15/620,900

(22) Filed: Jun. 13, 2017

(65) Prior Publication Data

US 2018/0165323 A1 Jun. 14, 2018

(30) Foreign Application Priority Data

Dec. 9, 2016 (RU) ................................ 2016148297

(51) Int. Cl.
*G06F 16/00* (2019.01)
*G06F 16/23* (2019.01)
*G06F 11/14* (2006.01)
*G06F 16/178* (2019.01)

(52) U.S. Cl.
CPC ...... *G06F 16/2365* (2019.01); *G06F 11/1448* (2013.01); *G06F 16/178* (2019.01)

(58) Field of Classification Search
CPC combination set(s) only.
See application file for complete search history.

(56) References Cited

U.S. PATENT DOCUMENTS

| | | | |
|---|---|---|---|
| 6,070,003 A | 5/2000 | Gove et al. | |
| 6,550,035 B1 | 4/2003 | Okita | |
| 7,549,110 B2 | 6/2009 | Stek et al. | |
| 7,559,007 B1 | 7/2009 | Wilkie | |
| 7,581,156 B2 | 8/2009 | Manasse | |
| 8,458,515 B1 | 6/2013 | Saeed | |
| 8,532,212 B2 | 9/2013 | Ito | |
| 8,683,296 B2 | 3/2014 | Anderson et al. | |
| 8,683,300 B2 | 3/2014 | Stek et al. | |
| 8,762,642 B2 | 6/2014 | Bates et al. | |
| 8,914,706 B2 | 12/2014 | Anderson | |
| 9,588,849 B2 * | 3/2017 | Sinha | G06F 16/00 |
| 9,760,446 B2 * | 9/2017 | Hammer | G06F 16/00 |
| 9,928,005 B2 * | 3/2018 | Sinha | G06F 16/00 |
| 2002/0009134 A1 | 1/2002 | Fischel et al. | |

(Continued)

OTHER PUBLICATIONS

U.S. Non-Final Office Action dated Oct. 5, 2017 for U.S. Appl. No. 15/193,407; 14 pages.

(Continued)

*Primary Examiner* — Farhan M Syed
(74) *Attorney, Agent, or Firm* — Daly, Crowley Mofford & Durkee, LLP

(57) ABSTRACT

A computer program product, system, and method for generating a test data set using object count and object size parameters, storing the generated data set in storage, subsequently regenerating the data set, and comparing the regenerated data set to the stored data set to validate the storage.

15 Claims, 5 Drawing Sheets

(56) References Cited

U.S. PATENT DOCUMENTS

| | | | |
|---|---|---|---|
| 2005/0038968 A1 | 2/2005 | Iwamura et al. | |
| 2006/0105724 A1 | 5/2006 | Nakao | |
| 2006/0147219 A1 | 7/2006 | Yoshino et al. | |
| 2008/0126357 A1* | 5/2008 | Casanova | G06F 16/1844 |
| 2009/0112953 A1* | 4/2009 | Barsness | G06F 12/0269 |
| 2010/0091842 A1 | 4/2010 | Ikeda et al. | |
| 2010/0180176 A1 | 7/2010 | Yosoku et al. | |
| 2010/0246663 A1 | 9/2010 | Citta et al. | |
| 2011/0053639 A1 | 3/2011 | Etienne Suanez et al. | |
| 2011/0055494 A1 | 3/2011 | Roberts et al. | |
| 2011/0196900 A1 | 8/2011 | Drobychev et al. | |
| 2012/0051208 A1 | 3/2012 | Li et al. | |
| 2012/0106595 A1 | 5/2012 | Bhattad et al. | |
| 2013/0067187 A1 | 3/2013 | Moss et al. | |
| 2014/0046997 A1* | 2/2014 | Dain | H04L 67/2861 709/201 |
| 2014/0136897 A1* | 5/2014 | Selivanov | G06F 11/263 714/33 |
| 2015/0363270 A1* | 12/2015 | Hammer | G06F 16/00 711/162 |
| 2016/0004605 A1* | 1/2016 | Ahn | G06F 16/00 707/679 |
| 2016/0210202 A1* | 7/2016 | Sinha | G06F 16/00 |
| 2016/0239384 A1 | 8/2016 | Slik et al. | |
| 2017/0046127 A1 | 2/2017 | Fletcher et al. | |
| 2017/0075947 A1 | 3/2017 | Kurilov et al. | |
| 2017/0083549 A1 | 3/2017 | Danilov et al. | |
| 2017/0131912 A1* | 5/2017 | Sinha | G06F 16/00 |
| 2018/0113769 A1* | 4/2018 | Ahn | G06F 16/00 |

OTHER PUBLICATIONS

U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
Anvin, "The mathematics of RAID-6;" Zytor; Dec. 20, 2011; 9 Pages.
Blomer et al.; "An XOR-Based Erasure-Resilient Coding Scheme;" International Computer Science Institute, Berkley, California; 1995; 19 Pages.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
Response to Office Action dated May 17, 2018 for U.S. Appl. No. 14/929,788, filed Aug. 14, 2018; 12 Pages.
Final Office Action dated Dec. 5, 2018 for U.S. Appl. No. 14/929,788; 14 Pages.
Response to U.S. Non-Final Office Action dated Nov. 27, 2017 for U.S. Appl. No. 15/186,576; Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Non-Final Office Action dated May 17, 2018 for U.S. Appl. No. 14/929,788; 18 Pages.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,819, filed Jan. 5, 2017, Danilov et al.
U.S. Non-Final Office Action dated Feb. 2, 2018 for U.S. Appl. No. 15/398,826; 16 Pages.
Non-Final Office Action dated Jun. 11, 2019 for U.S. Appl. No. 14/929,788; 11 Pages.

\* cited by examiner

DATA SET VERIFICATION

CROSS REFERENCE TO RELATED APPLICATIONS

This application claims priority to Russian Patent Application number 2016148297, filed Dec. 9, 2016, and entitled "DATA SET VERIFICATION," which is incorporated herein by reference in its entirety.

BACKGROUND

Data storage vendors offer a wide range of data storage systems. When new features or other changes are made to a data storage system, thorough testing is performed to maintain outstanding storage quality. For example, at each release development cycle, endurance testing (or "longevity testing") may be performed. As part of endurance testing, several large data sets may be generated and stored to the storage system. Each data set may include a collection of data (e.g., a collection of objects). The data sets may be stored over some selected time period (e.g., some number of hours or days), after which the data sets may be read back from the storage system and their contents verified. Existing systems may require large amounts of testing data to be stored for data set verification.

SUMMARY

Described herein are embodiments of systems and methods for reliable data set verification that require relatively low storage capacity.

In accordance with one aspect of the disclosure, a method comprises: receiving parameters including an object count (N) and an object size; generating a data set key; generating N object ids using the data set key and the object count; for each object id, generating corresponding object contents using the object id and the object size; adding the generated object ids and corresponding object contents to a storage system under testing; regenerating the N object ids using the data set key and the object count; for each object id, regenerating the corresponding object contents using the object id and the object size; retrieving, from the storage system under testing, object contents for each of the N regenerated object ids; and comparing, for each of the regenerated N object ids, the regenerated object contents to the retrieved object contents to determine if the storage system under testing corrupted one or more objects.

In some embodiments, the parameters further include a data set name, and the method further includes storing the data set key, object count (N), and object size to local storage using the data set name. In certain embodiments, comparing the regenerated object contents to the retrieved object contents includes determining if object contents could be retrieved from the storage system under testing for one or more of the regenerated N object ids. In many embodiments, generating the data set key includes generating the data set key using a pseudo-random number generator (PRNG). In particular embodiments, generating the N object ids using the data set key and the object count includes generating the N object ids using a pseudo-random number generator (PRNG) seeded with the data set key. In some embodiments, generating object contents using an object id and the object size includes generating object contents using a pseudo-random number generator (PRNG) seeded with the object id.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the systems and methods sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

As used herein, the term "storage system" encompass, for example, private or public cloud computing systems for storing data as well as systems for storing data comprising virtual infrastructure and those not comprising virtual infrastructure. As used herein, the terms "client" and "user" may refer to any person, system, or other entity that uses a storage system to read/write data. The term "I/O request" or simply "I/O" may be used herein to refer to a request to read or write data.

Figure 1:
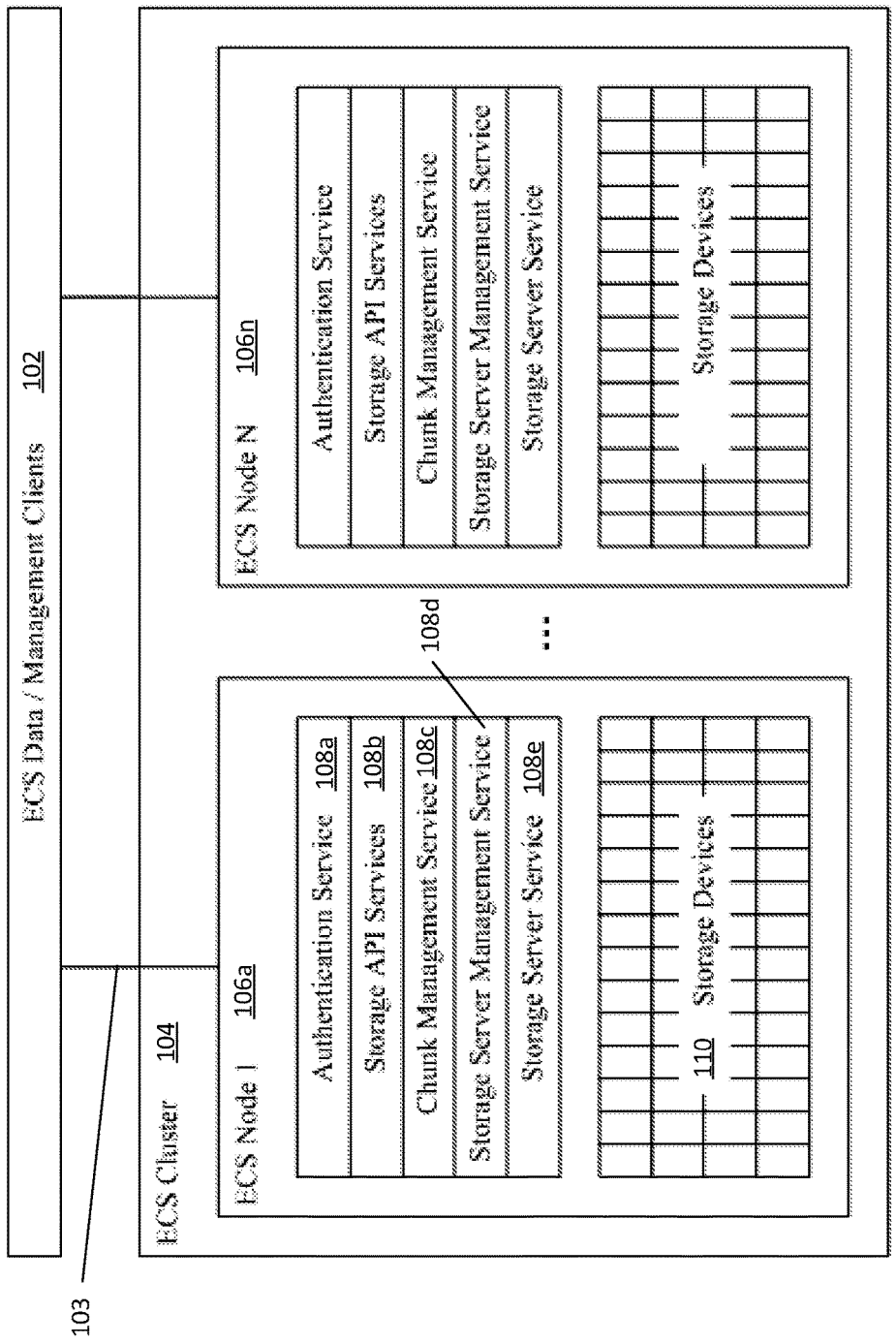
FIG. 1 is a block diagram of an illustrative storage system, according to an embodiment.

Referring to FIG. 1, an illustrative storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols.

The storage cluster 104 includes one or more storage nodes 106a . . . 106n (generally denoted 106). Storage node 106a, which may be representative of other storage nodes, includes one or more services 108 and one or more storage devices 108. A storage node 106 may include a processor (not shown) configured to execute the services 108.

The illustrative storage node 106a includes the following services: an authentication service 108a to authenticate requests from clients 102; storage API services 108b to parse and interpret requests from clients 102; a chunk management service 108c to facilitate chunk allocation/reclamation for different storage system needs and monitor chunk health and usage; a storage server management service 108d to manage available storage devices capacity and to track storage devices states; and a storage server service 108e to interface with the storage devices 110.

A storage device 100 may comprise one or more physical and/or logical storage devices attached to the storage node 106a. A storage node 106 may utilize VNX, Symmetrix VMAX, and/or Full Automated Storage Tiering (FAST), which are available from Dell EMC of Hopkinton, Mass. While vendor-specific terminology may be used to facilitate understanding, it is understood that the concepts, techniques, and structures sought to be protected herein are not limited to use with any specific commercial products.

In certain embodiments, the storage cluster 104 may be an object storage system. In some embodiments, the storage cluster 104 may be provided as Elastic Cloud Storage (ECS) from Dell EMC of Hopkinton, Mass.

In operation, clients 102 send I/O requests to the storage cluster 104 to read/write data. In some embodiments where the storage cluster 104 is an object storage system, the I/O requests include object ids to uniquely identify objects within the cluster 104. Any available storage node 106 may receive a client I/O request. The receiving node 106 may process the request locally and/or may delegate request processing to one or more peer nodes 106. For example, if a client issues an object read request, the receiving node may delegate/proxy the request to peer node where the object's data resides.

Figure 2:
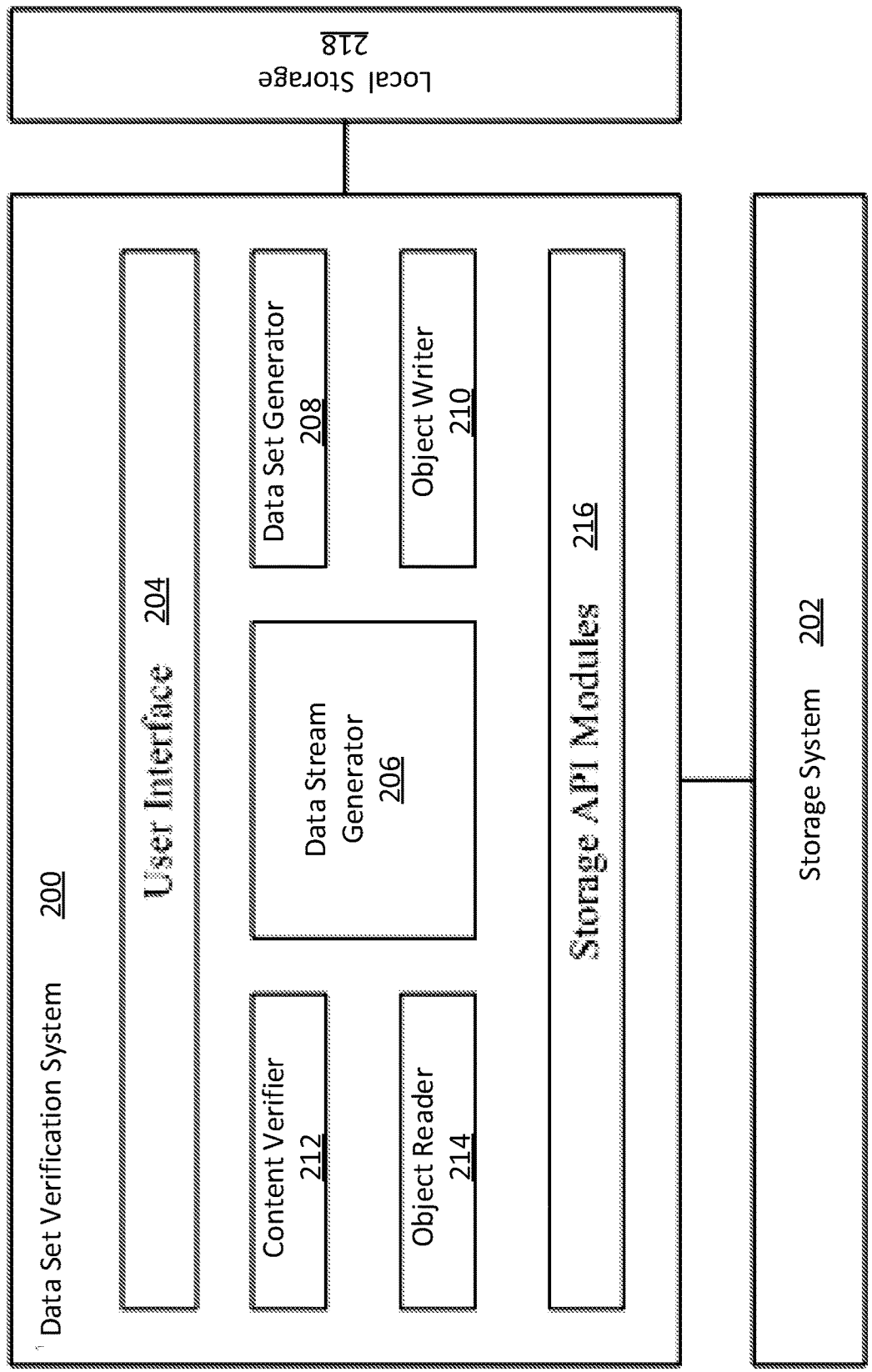
FIG. 2 is block diagram of an illustrative data set verification system, according to one embodiment.

Referring to FIG. 2, according to one embodiment, a data set verification system 200 may be used to test a storage system 202. The data set verification system 200 includes a user interface 204, a data stream generator 206, a data set generator 208, an object writer 210, a content verifier 212, an object reader 214, and storage API modules 216.

The data set verification system 200 has read/write access to a local storage 218. In some embodiments, local storage 218 may be provided as locally attached storage device (e.g., a disk drive). In various embodiments, the data set verification system 200 uses local storage 218 to store information that can be used to regenerate data sets.

The user interface 204 may include graphical and/or textual-based interfaces to allow a user to configure tests, to execute tests against the storage system 202, and to view the results of such tests.

The data stream generator 206 is configured to receive as input a key and a data size. In response, the data stream generator 206 generates as output a stream of quasi-random data that is reproducible based on the key and the data size. In some embodiments, the data stream generator 206 uses a pseudo-random number generator (PRNG) to generate the stream of data. In some embodiments, the PRNG may be seeded using the received key.

In various embodiments, the data verification system 200 can be used to generate data sets and add the corresponding objects to the storage system 202. In certain embodiments, user interface 204 may receive as input a data set name, an object count (N), and an object size (S). These parameters may be passed to the data set generator 208, which in turn generates a data set key and passes the data set key and the object count (N) to the data stream generator 206. The data stream generator 206 returns a quasi-random data stream that is used by the data set generator 208 as a list of N object ids. For each object id, the data set generator 208 passes the object id and the object size (S) to the data stream generator 206, which returns a quasi-random data stream that the data set generator 208 uses as the object's contents. Next, the data set generator 208 may pass each object id and the respective object contents to the object writer 210, which uses the storage API modules 216 to add the objects to the storage system 200. The data set generator 208 may store the input parameters along with the generated data set key to local storage 218. In certain embodiments, the data set name can be used to subsequently retrieve this information from local storage 218 (e.g., the information may be stored within a file named with the data set name).

In various embodiments, the data verification system 200 can be used to verify data sets stored within the storage system 202. In certain embodiments, user interface 204 receives as input the name of the data set to be verified. The user interface 204 passes the data set name to the data set generator 208, which uses the data set name to retrieve a data set key, object count, and object size from local storage 218. The data set generator 208 passes the data set key and the object count (N) to the data stream generator 206, which returns a quasi-random data stream that the data set generator 208 uses as a list of N object ids. The data set generator 208 may pass the object ids, one by one, to the object reader 214, which uses the storage API modules 216 to retrieve object content from the storage system 202. The data set generator 208 also passes the each object id, along with the object size, to the data stream generator 206, which returns a quasi-random data stream that the data set generator 208 uses to regenerate object contents of size S. Owing to the semantics of the data stream generator 206, as discussed above, the list of object ids and the respective object contents are identical to the object ids and contents that were previously generated when the data was added to storage 202. In some embodiments, the objects can be regenerated within the data set verification system 200 in parallel with the objects being retrieved from storage 202. For each object, the object contents retrieved from the storage 202 may be compared to the regenerated object contents. If the object contents are not identical or if the object cannot be found in storage 202 (e.g., the storage replies with a "no such object" error code), then a verification failure may be reported via the user interface 204.

In many embodiments, the data set verification system 200 can efficiently generate and verify a large number of data objects (e.g., thousands or even millions of objects), and thus is well suited for endurance-type tests.

Figure 3:
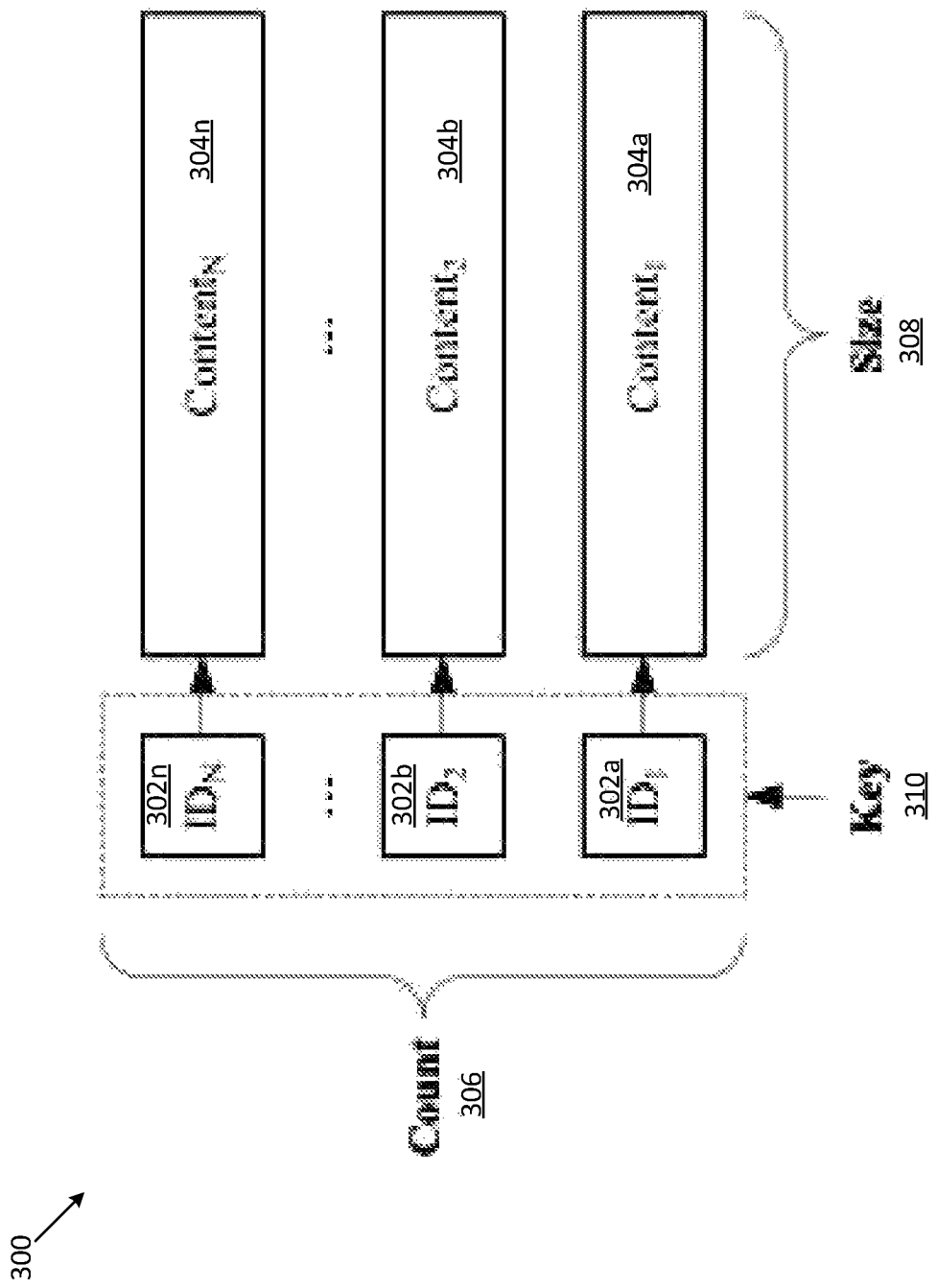
FIG. 3 is diagram showing a technique for generating a data set, according to some embodiments.

FIG. 3 illustrates a technique for generating a data set 300 in a reproducible manner. The data set 300 includes object ids 302a-302n (302 generally) and respective object contents 304a-304n. The data set 300 can be fully generated, in a reproducible manner, using an object count parameter 306, an object size parameter 308, and a data set key 310. The data set key 310 may be generated using any suitable technique. For example, the data set key 310 may be a random value. The data set key 310 can be used to generate the set of object ids 302, which in turn can be used to generate object contents 304, as discussed above. It should be appreciated that arbitrarily large data sets (e.g., data sets having 100 M objects of size 100 MB each) can be generated using just three values: a data set key 310, an object count 306, and an object size 308.

Figure 4:
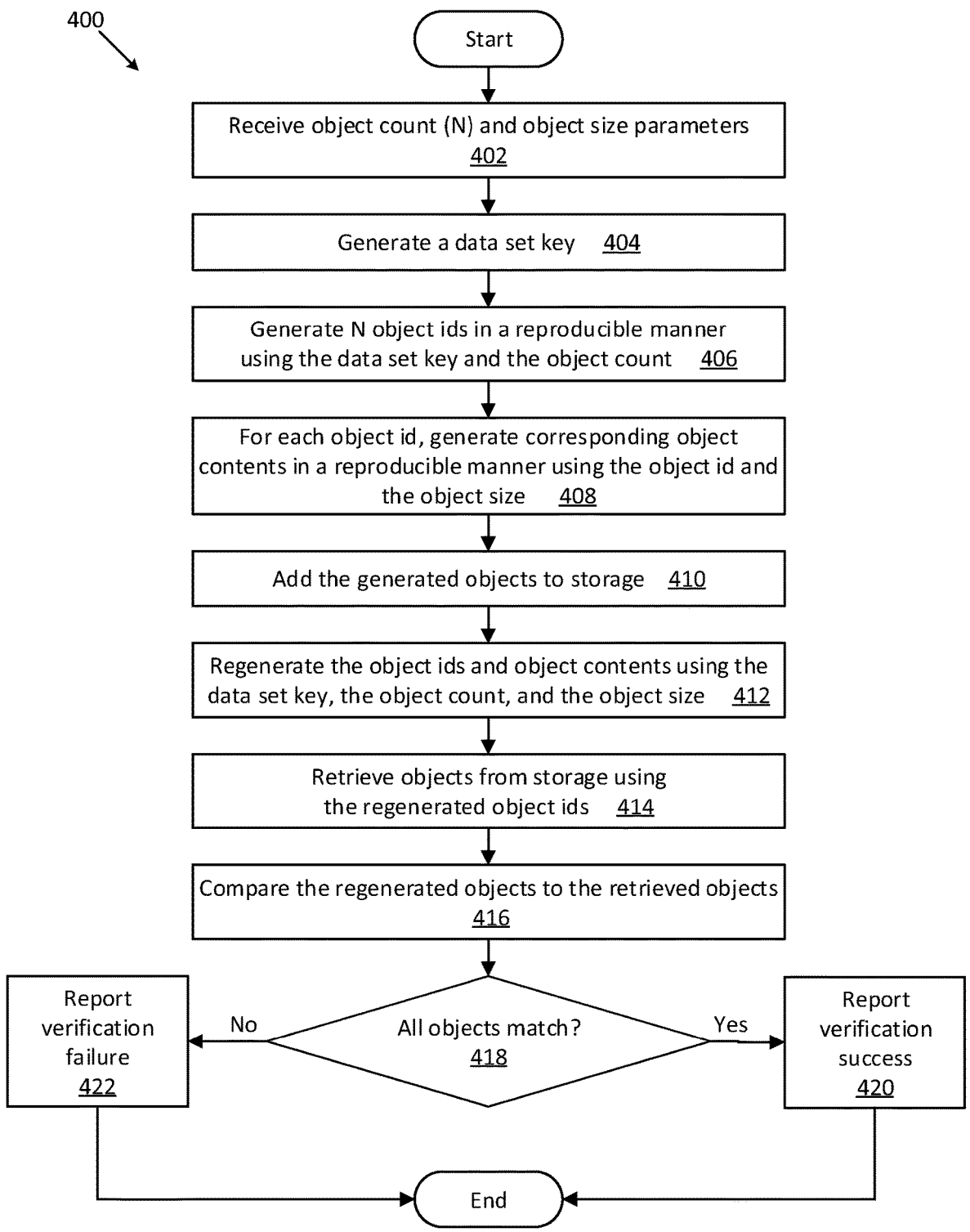
FIG. 4 is flow diagram illustrating processing that may occur within a data set verification tool, accordance to an embodiment.

FIG. 4 is a flow diagram showing illustrative processing that can be implemented within a data set verification system (e.g., system 200 in FIG. 2). Rectangular elements (typified by element 402), herein denoted "processing blocks," represent computer software instructions or groups of instructions. Diamond shaped elements (typified by element 418), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4, a method 400 begins at block 402, where an object count (N) and an object size parameter are received. In some embodiments, these parameters may be received from a user (e.g., via user interface 204 in FIG. 2). At block 404, a data set key is generated.

At block 406, a set of N object ids may be generated in a reproducible manner based on the data set key and the object count. In some embodiments, the set of object ids may be generated using a PRNG seeded within the data set key.

At block 408, for each object id, corresponding object contents are generated in a reproducible manner using the object id, along with the object size parameter. In some embodiments, an object's contents may be generated using a PRNG seeded within the object id. At block 410, the generated objects—i.e., the generated pairs of [object ids, object contents]—are added to a storage system (e.g., storage system 100 in FIG. 1).

Subsequently, blocks 412-422 can be used to verify the contents of the data set within the storage system. In particular, at block 412, the object ids and respective object contents are regenerated using the data set key, the object count, and the object size. At block 414, the data set objects within the storage system may be retrieved using the regenerated object ids.

At block 416, the regenerated objects may be compared with the retrieved objects. For example, for each regenerated object id, the corresponding regenerated object contents may be compared, byte-for-byte, to the corresponding object contents retrieved from the storage system. At block 418, if all objects match, then a verification success may be reported (block 420). Otherwise, the data set in storage is determined to be corrupt and a verification failure may be reported (block 422). In some embodiments, verification success/failure may be reported to a user (e.g., via user interface 204 in FIG. 2).

The data set verification techniques and structures described herein can be used to create testing systems for many different commercially available storage systems, including not only object-based storage systems but also file- and block-based storage systems.

Figure 5:
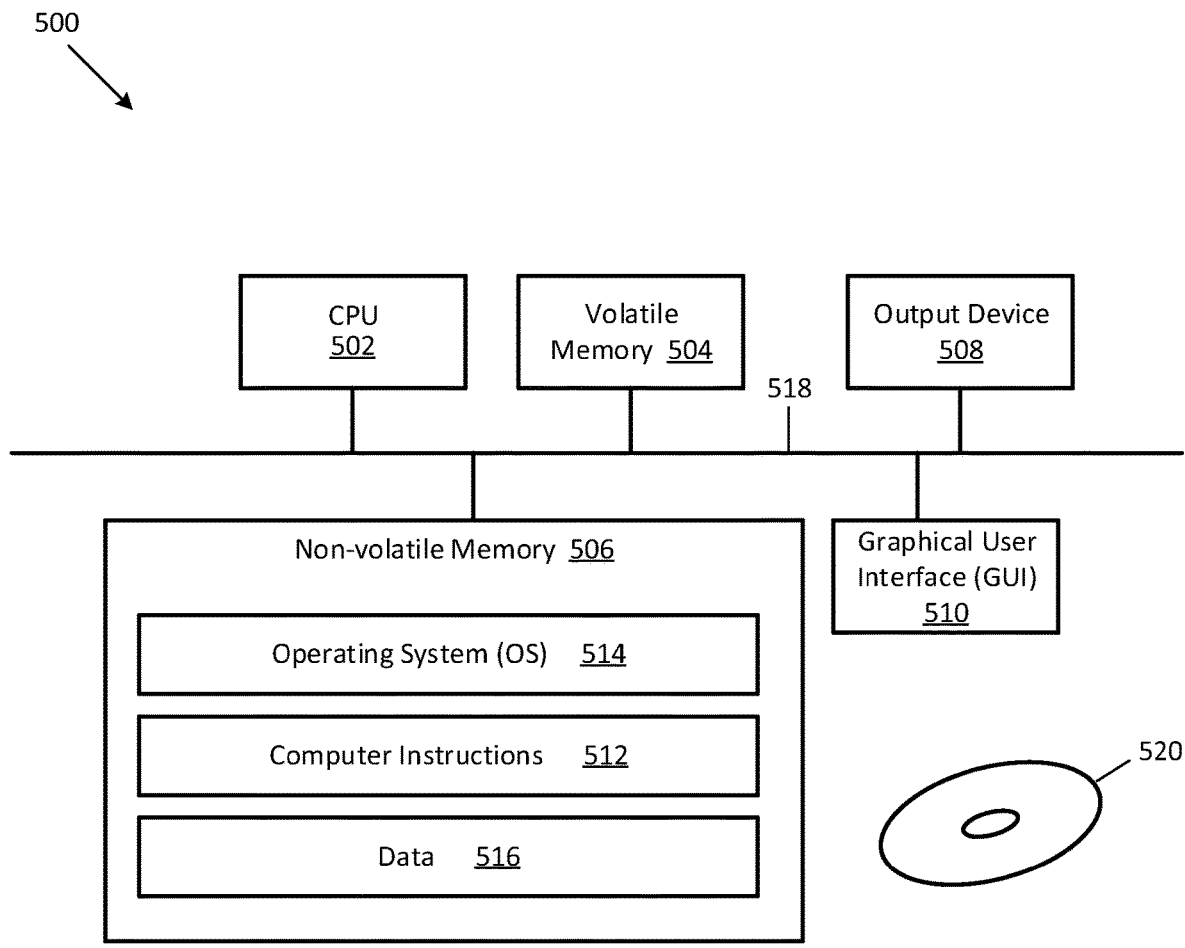
FIG. 5 is block diagram of a computer on which the processing of FIG. 4 may be implemented, according to an embodiment of the disclosure.

FIG. 5 shows an illustrative computer or other processing device 500 that can perform at least part of the processing described herein. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504.

In some embodiments, a non-transitory computer readable medium 520 may be provided on which a computer program product may be tangibly embodied. The non-transitory computer-readable medium 520 may store program instructions that are executable to perform the processing of FIG. 4.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for testing storage systems, comprising:
   receiving parameters including an object count (N) and an object size, the parameters being received as user input via a user interface for specifying storage system tests;
   generating, by a data set generator, a data set key, and providing the data set key to a data stream generator;
   generating, by the data stream generator, a quasi-random data stream of N object identifiers based on based on the data set key and the object count and providing the quasi-random data stream to the data set generator;
   providing, by the data set generator, each of the N object identifiers to the data stream generator together with the object size;
   for each of the N object identifiers, receiving, by the data set generator, object contents corresponding to the object identifier and adding the object identifier and the object identifier's corresponding object contents to a storage system under testing, the object identifier's corresponding object contents being generated by the data stream generator in response to the object identifier, the object identifier's corresponding object contents including quasi-random data that is reproducible based on the object identifier and the object size;
   regenerating the N object identifiers using the data set key and the object count;
   for each of the N object identifiers, regenerating the object identifier's corresponding object contents using the object identifier and the object size;
   for each of the N object identifiers, retrieving, from the storage system under testing, the object identifier's corresponding object contents; and
   detecting whether the storage system under testing is operating correctly by comparing each object identifier's corresponding regenerated contents to the object identifier's corresponding retrieved contents.

2. The method of claim 1 wherein the parameters further include a data set name, the method further including: storing the data set key, object count (N), and object size to local storage using the data set name.

3. The method of claim 1 wherein generating the data set key includes generating the data set key using a pseudo-random number generator (PRNG).

4. The method of claim 1 wherein the quasi-random data stream of N object identifiers is generated by using a pseudo-random number generator (PRNG) seeded with the data set key.

5. The method of claim 1 wherein each object identifier's corresponding object contents are generated by using a pseudo-random number generator (PRNG) seeded with the object identifier.

6. A system comprising:
   a processor;
   a volatile memory; and
   a non-volatile memory storing computer program code which, when executed on the processor, causes the processor to execute a process operable to perform the operations of:
   receiving parameters including an object count (N) and an object size, the parameters being received as user input via a user interface for specifying storage system tests;
   generating, by a data set generator, a data set key, and providing the data set key to a data stream generator;
   generating, by the data stream generator, a quasi-random data stream of N object identifiers based on the data set key and the object count, and providing the quasi-random data stream to the data set generator;
   providing, by the data set generator, each of the N object identifiers to the data stream generator together with the object size;
   for each of the N object identifiers, receiving, by the data set generator, object contents corresponding to the object identifier and adding the object identifier and the object identifier's corresponding object contents to a storage system under testing, the object identifier's corresponding object contents being generated by the data stream generator in response to the object identifier, the object identifier's corresponding object contents including quasi-random data that is reproducible based on the object identifier and the object size;
   regenerating the N object identifiers using the data set key and the object count;
   for each of the N object identifiers, regenerating the object identifier's corresponding object contents using the object identifier and the object size;
   for each of the N object identifiers, retrieving, from the storage system under testing, the object identifier's corresponding object contents; and
   detecting whether the storage system under testing is operating correctly by comparing each object identifier's corresponding regenerated contents to the object identifier's corresponding retrieved contents.

7. The system of claim 6 wherein the parameters further include a data set name, the computer program code causes the processor to execute a process further operable to perform the operations of: storing the data set key, object count (N), and object size to local storage using the data set name.

8. The system of claim 6 wherein generating the data set key includes generating the data set key using a pseudo-random number generator (PRNG).

9. The system of claim 6, wherein the quasi-random data stream of N object identifiers is generated by using a pseudo-random number generator (PRNG) seeded with the data set key.

10. The system of claim 6 wherein each object identifier's corresponding object contents are generated by using a pseudo-random number generator (PRNG) seeded with the object identifier.

11. A computer program product tangibly embodied in a non-transitory computer-readable medium, the computer-readable medium storing program instructions that are executable to:

receive parameters including an object count (N) and an object size, the parameters being received as user input via a user interface for specifying storage system tests;

generate, by a data set generator, a data set key, the data set key including a random value, and providing the data set key to a data stream generator;

generate, by the data stream generator, a quasi-random data stream of N object identifiers based on the data set key and the object count and providing the quasi-random data stream to the data set generator;

providing, by the data set generator, each of the N object identifiers to the data stream generator together with the object size;

for each of the N object identifiers, receive, by the data set generator, object contents corresponding to the object identifier and add the object identifier and the object identifier's corresponding object contents to a storage system under testing, the object identifier's corresponding object contents being generated by the data stream generator in response to the object identifier, the object identifier's corresponding object contents including quasi-random data that is reproducible based on the object identifier and the object size;

regenerate the N object identifiers using the data set key and the object count;

for each of the N object identifiers, regenerate the object identifier's corresponding object contents using the object identifier and the object size;

for each of the N object identifiers, retrieve, from the storage system under testing, the object identifier's corresponding object contents; and detecting whether the storage system under testing is operating correctly by comparing each object identifier's corresponding regenerated contents to the object identifier's corresponding retrieved contents.

12. The computer program product of claim 11 wherein the parameters further include a data set name, the program instructions further executable to: store the data set key, object count (N), and object size to local storage using the data set name.

13. The computer program product of claim 11 wherein generating the data set key includes generating the data set key using a pseudo-random number generator (PRNG).

14. The computer program product of claim 11 wherein the quasi-random data stream of N object identifiers is generated by using a pseudo-random number generator (PRNG) seeded with the data set key.

15. The computer program product of claim 11 wherein each object identifier's corresponding object contents are generated by using a pseudo-random number generator (PRNG) seeded with the object identifier.

* * * * *